United States Patent [19]

Kozuki et al.

[11] Patent Number: 4,495,527
[45] Date of Patent: Jan. 22, 1985

[54] VIDEO RECORDING SYSTEM WITH FOCUSING DEVICE

[75] Inventors: Susumu Kozuki; Masaya Maeda; Hiroyuki Takimoto, all of Kanagawa, Japan

[73] Assignee: Canon Kabushiki Kaisha, Tokyo, Japan

[21] Appl. No.: 351,897

[22] Filed: Feb. 24, 1982

[30] Foreign Application Priority Data

Mar. 5, 1981 [JP] Japan ................................. 56-31888

[51] Int. Cl.³ .......................................... H04N 5/782
[52] U.S. Cl. .................................... 360/33.1; 358/227; 358/335; 358/906; 354/400; 350/255
[58] Field of Search .................... 358/227, 335, 906; 360/33.1, 85; 250/201; 354/25, 400, 404; 350/255

[56] References Cited

U.S. PATENT DOCUMENTS

| 4,074,082 | 2/1978 | Sato | 369/11 |
| 4,329,033 | 5/1982 | Masunaga | 250/201 |
| 4,368,490 | 1/1983 | Takimoto | 358/335 |
| 4,386,376 | 5/1983 | Takimoto | 358/906 |
| 4,404,595 | 9/1983 | Ushiro | 358/227 |
| 4,442,462 | 4/1984 | Kimura | 360/33.1 |

FOREIGN PATENT DOCUMENTS 52-58315  5/1977  Japan ................................. 358/906

Primary Examiner—Alan Faber
Attorney, Agent, or Firm—Toren, McGeady and Stanger

[57] ABSTRACT

A video system includes a video camera for obtaining image signals, and a video recorder for recording the image signals. Driving power provided in the recorder, for loading a tape over a recording drum, is transmitted to the video camera after the tape is fully loaded on the drum. Movable parts in the video camera such as an automatic focus adjusting mechanism, can then be driven by the driving power source in the recorder.

9 Claims, 4 Drawing Figures

VIDEO RECORDING SYSTEM WITH FOCUSING DEVICE

FIELD OF THE INVENTION

The present invention relates to a video system comprising a video camera for obtaining image signals and a video recorder for recording the image signals.

DESCRIPTION OF PRIOR ARTS

Quite recently, the video tape recorder or so-called VTR is becoming more and more compact. A portable VTR has become popular together with a video camera for outdoor photographing. However, at present, the video camera is constructed separately from the VTR, and they are connected to each other by way of cables. This arrangement therefore is inconvenient to handle.

Consequently, various kinds of video cameras each integrated with a VTR, have been proposed. Presently, however, the proposed systems are not practical because of problems in volume and weight. It is of course necessary that such systems be compact and light to enhance their portability and operability.

SUMMARY OF THE INVENTION

One object of the present invention is to offer a compact and light video system including a video camera and a recorder, wherein the driving power produced in the video recorder for recording an image signal is used as driving power for movable parts of the video camera.

Another object of the present invention is to offer a video system in which the camera can be mounted on the recorder in such a manner that the driving power of the recorder can be transmitted to the video camera.

Yet another object of the present invention is to offer a video system in which the video camera has an automatic focusing lens for which the driving power is obtained from the recorder.

Further objects of the present invention will be obvious from the description made hereinbelow with reference to the drawings.

DESCRIPTION OF PREFERRED EMBODIMENTS

Figure 1:
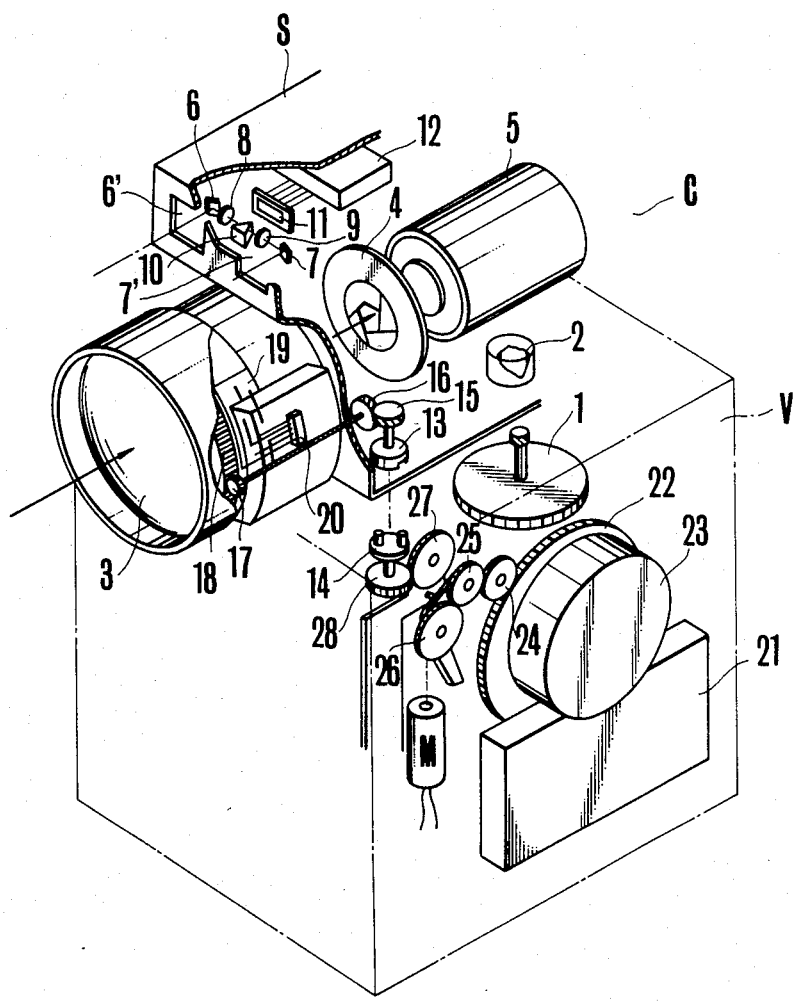
FIG. 1 is a perspective view of essential components of an embodiment of the video camera and VTR of the present invention.

FIG. 1 shows an outline of the principal mechanical construction of an embodiment of the video camera and VTR of the present invention. In the drawing, a VTR V is arranged for recording a picture signal on a tape shaped recording medium, and a camera C converts the object image into electrical signals. The VTR V and the camera C are connected to each other with a tripod screw 1 and a nut 2. The camera C is provided with an automatic focusing lens 3, in such a manner that an object image is formed on an image pick up tube 5 through the lens 3 and a diaphragm 4. Above the automatic focusing lens 3, a distance measuring device S which measures the distance up to the object, trigonometrically in a conventional way, is provided. In the distance measuring device, reflecting mirrors 6 and 7 are arranged so as to face distance measuring windows 6' and 7' formed on both ends of a certain determined base line on the front of the casing. Image forming lenses 8 and 9 are provided for receiving the light from the reflecting mirrors 6 and 7 so as to form a distance detecting image. A reflecting prism 10 is provided for deviating the image light beam from the image forming lenses so that they form a base line distance measuring optical system. A linear image sensor 11 such as CCD is arranged at the position which the image forming light beam reaches from the prism 10 (the focusing plane of the image forming lenses 8 and 9). A distance and focus detecting circuit 12 detects the distance to the object from the image scanning output of the image sensor 11, and detects the focusing state of the lens 3, namely in focus, near focus or far focus by means of the data obtained by the distance detection and data for representing the position of the automatic focusing lens 3, as explained later, on the optical axis. The detecting circuit 12 includes IC chips. A coupler 13 is arranged to be connected to a coupling 14 explained later, at the side of VTR on the camera bottom, wherein the coupler is engaged with a focusing gear 18 via gears 15, 16 and 17. Thus, along with the rotation of the gear 18 the automatic focusing lens 3 advances or retracts along the optical axis in a conventional way. A grey code signal plate 19 includes a combination of a conductive and a non-conductive pattern for indicating the position of the focusing lens along the optical axis with digital words of a certain determined number of bits, and is arranged on the circumference of the focusing gear 18. A brush 20 is provided at a fixed position so as to be in contact with the grey code signal plate 19, whereby the data representing the position of the lens 3 along the optical axis is obtained through the brush 20 as a digital signal with a certain determined number of bits, and delivered to the distance and focus detecting circuit 12.

The image sensor 11 receives two images respectively formed with the mirrors 6 and 7, and the lenses 8 and 9. The detecting circuit 12 determines the distance up to the object by detecting the correlation of the positions of the two images based upon the scanning signal representing the two images from the image sensor 11. By comparing the obtained digital distance data with the digital data concerning the position of the focusing lens obtained from the brush 20, the focusing state of the automatic focusing lens 3 is detected. U.S. patent application Ser. No. 121,690 (filed on Feb. 15, 1980) now U.S. Pat. No. 4,329,033 discloses such a circuit arrangement.

Below the VTR V will be explained in accordance with FIG. 1 and FIG. 2.

Figure 2:
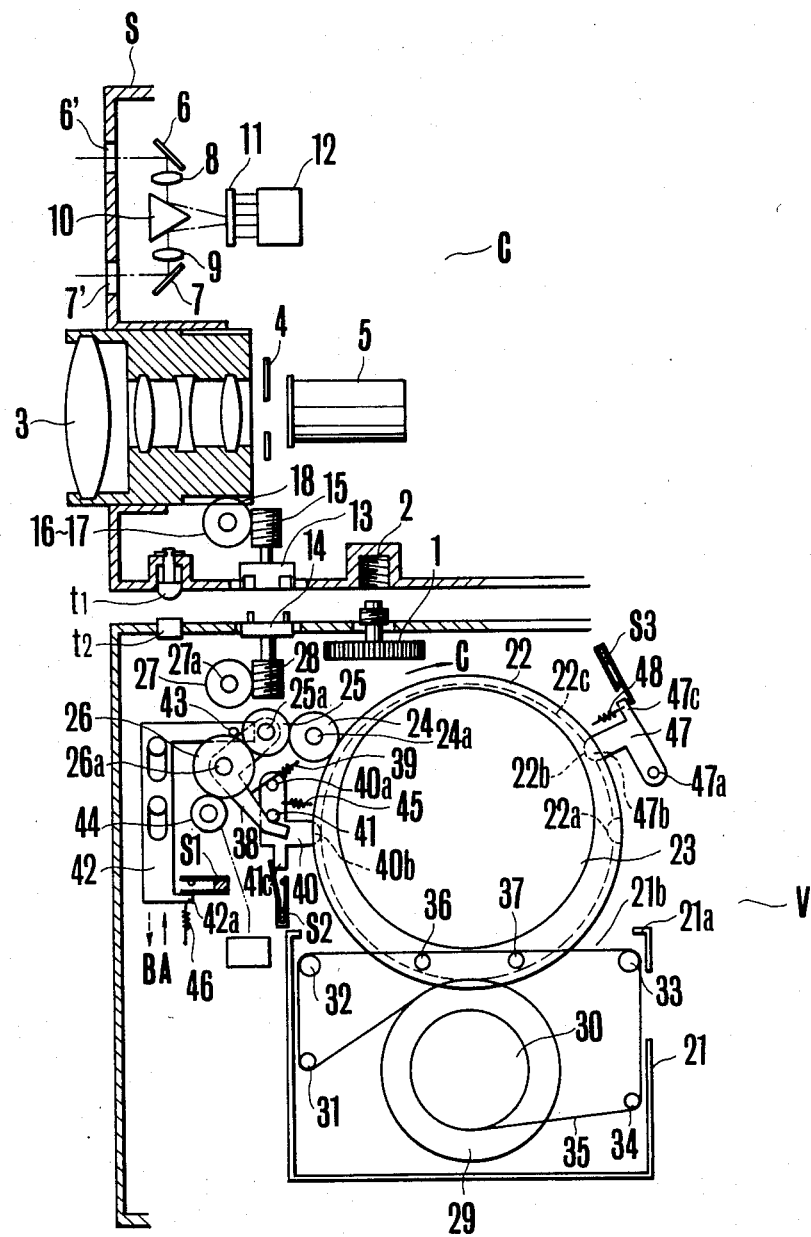
FIG. 2 is a side view, partially in section of an engaging mechanism in the embodiment of FIG. 1.

FIG. 2 shows an engaging mechanism of FIG. 1 in section, whereby members having the same figures as those in FIG. 1 are the same members. Further, the arrangement of the distance measuring device S at the side of the camera C is shown differently from FIG. 1 in order to show the internal arrangement. FIG. 2 shows a tape cassette 21, above which a loading ring 22 and a guide drum 23 are arranged. The loading ring 22 is connected to the motor via a gear group 24, 25, 26. The coupling 14 at the side of VTR to be connected to the coupler 13 at the side of the camera, is engaged with a gear 28 via a gear 27. In the state shown in FIG. 2, the tape in the cassette has not yet begun to be loaded and the feeding reel 29 and the winding reel 30 of the cassette 21 are coaxially arranged, wherein the tape 35 is tensioned between the reels by means of the tape guide pins 31, 32, 33 and 34. In the front wall 21a of the casing of the cassette 21 an opening 21b is formed, whereby the tape 35 is arranged at the opening 21b by means of a guide pins 32 and 33 in such a manner that the recording plane of the tape 35 faces the opening 21b. On the front of the lower plate (not shown in the drawing) of the casing of the cassette 21, a certain determined notch leading to the above opening 21b is formed in such a manner that when the cassette 21 is loaded, tape pulling out guides 36 and 37 provided on the loading ring 22 are positioned inside of the tape 35 extending within opening 21b.

The loading ring 22, which is driven as explained later, pulls out the tape 35 from the cassette 21 and brings it over a predetermined range of the circumference of the guide drum 23.

The guide drum 23 has a central axis inclined to that of the loading ring 22 and a recording magnetic head (not shown in the drawing) inside the guide drum. Thus, along with the rotation of the magnetic head, the image signal is recorded on the tape.

In the present specification, the operation of pulling out the tape 35 from the cassette 21 and bringing it on the circumference of the guide drum 23 is called loading, while the operation of removing the tape 35 from the guide drum 23 and placing the tape 35 into the state before, loading is called unloading.

On the circumference of the loading ring 22, concave portions 22a and 22b are arranged so as to correspond to a loading finish position and an unloading finish position respectively, while a driving gear part 22c is provided over the upper edge of the circumference. The driving gear 22c engages the gear 24 supported on a pin 24a provided on the chassis (not shown in the drawing). In the non-operative state shown in FIG. 2, the gear 24 is also engaged with the change over gear 25. The gear 25 is rotatably supported by pin 25a at one end of an L-shaped power change over lever 38 which pivots on pin 26a provided on the chassis.

The change over lever 38 is urged by means of a spring 39 along the counterclockwise direction, whereby its rotation along that direction is prevented by means of a pin 41 on a loading finish detecting lever 40, and a pin 43 on a slide plate 42. Further, the pin 26a which supports the change over lever 38 also supports a gear 26. This gear is normally in the engaged state with the gears 25 and 44. The gear 44 is fixed on the rotating shaft of the DC motor M so as to be rotated by the motor M. Consequently, the rotation of the motor M is always transmitted to the change over gear 25 mounted at one end of the change over lever 38.

The loading end detecting lever 40 is rotatably supported on a pin 40a provided on the chassis. The detecting lever 40 is urged by means of a spring 45 along the counterclockwise direction, whereby the end of a right arm 40b is positioned so as to be always in contact with the circumference of the loading ring 22. The end of the other arm 41c of the detecting lever 40 is in contact with a loading finish detecting switch S2, keeping the switch S2 in the switched off state when the VTR is non-operative as shown in FIG. 2.

The slide plate 42 is movable within a certain determined range along the direction of arrows A and B in the drawing, by means of positioning pins extending in long holes in the plate 42, and is normally urged by means of a spring 46 along the direction of arrow B. The slide plate 42 is operatively engaged with a recording button (not shown) at the side of the VTR so as to be moved against the strength of the spring 46 along the direction of the arrow A when the recording button is depressed. An operation piece 42a is formed on the slide plate 42 so as to bring a recording mode detecting micro switch S1 in the closed state when the slide plate 42 is moved in the direction of the arrow A along with the depression of the recording button. Further, at a predetermined position in the neighborhood of the upper end of the slide plate 42, a worm wheel 27 is arranged. The worm wheel 27 is rotatably supported by a pin 27a and engages the worm gear 28 integral with the coupling 14 at the side of the VTR on the camera bottom.

Further, in the neighborhood of the circumference of the above loading ring 22, an unloading finish detecting lever 47 is arranged. The lever 47 is rotatably supported by a pin 47a, being urged by a spring 48 along the counter-clockwise direction. One end 47b of the lever 47 is normally in contact with the circumference of the loading ring 22 under the strength of the spring 48, and is set into the concave portion 22b formed in the circumference of the loading ring 22 so as to correspond to an unloading finish in the non-operative state of the VTR shown in FIG. 2. The other end 47c of the lever 47 operates an unloading finish detecting switch S3, which is closed in this state.

Figure 3:
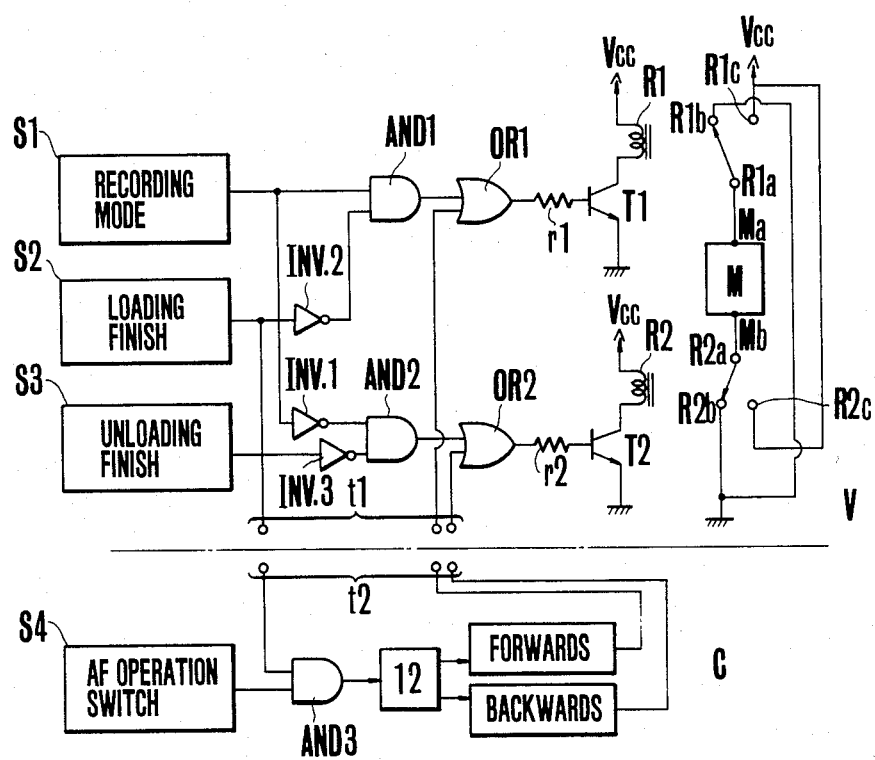
FIG. 3 is a schematic diagram of a driving circuit for a loading motor.

The terminal group t1 at the side of the camera C, and the group t2 at the side of the VTR V are the terminal groups connecting the camera C and the VTR for controlling the loading motor M. FIG. 3 shows the driving circuit of the loading motor M. In FIG. 3, at the side of the VTR V, are respectively a recording mode detecting switch S1, a loading finish detecting switch S2 and an unloading finish detecting switch S3, whose output levels are high in the closed state and low in the opened state. The output of the above switch S1 is connected to an input of an AND circuit AND 1, and inverted by an inverter INV 1 and delivered to the AND circuit AND 2. The output S2 is inverted by an inverter INV 2 and delivered to the AND circuit AND 1 and to the camera C via terminal groups t1 and t2. Further, the output of the unloading finish detecting switch S3 is inverted by an inverter INV 3 and delivered to the AND circuit AND 2. The AND circuits AND 1 and AND 2 are respectively connected to the bases of switching transistors T1 and T2 for driving relays R1 and R2 via resistors r1 and r2 through OR circuits OR1 and OR2 in the next stage.

The collectors of the transistors T1 and T2 are connected to a DC power source Vcc through the exciting coils of the relays R1 and R2 respectively, and the emitters are grounded. The relays R1 and R2 serve to drive the motor M and control the direction of the rotation, whereby the terminals Ma and Mb of the motor M are respectively connected to the fixed terminals R1a and R2a of the relays R1 and R2. In the stationary state the fixed terminals R1a and R2a of the relays R1 and R2 are connected to the change over terminals R1b and R2b, while when the current is supplied to the exciting coils the fixed terminals R1a and R2a are respectively connected to the change over terminals R1c and R2c. As is shown in the drawing, R1b and R1c are respectively connected to R2b and R2c.

Figure 4:
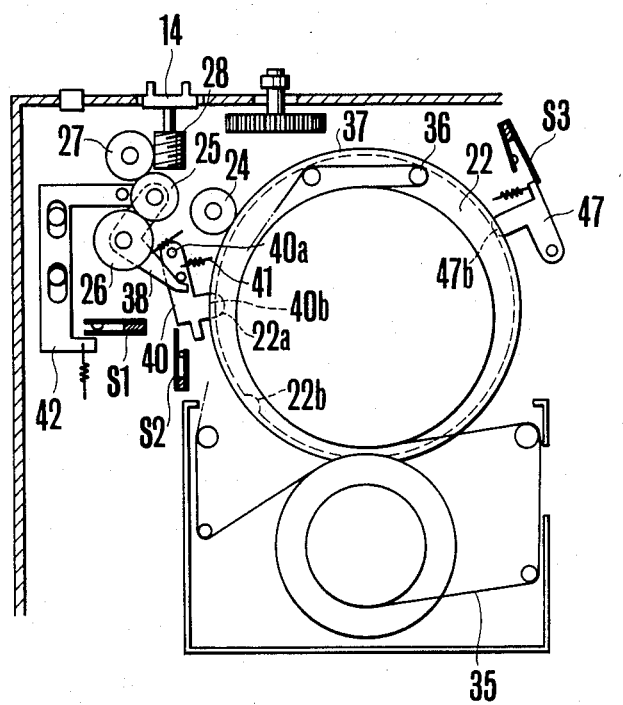
FIG. 4 is a view showing a tape loaded in the VTR by the engaging mechanism in FIG. 2.

With of the above-mentioned motor control circuit at the side of the VTR, and in the non-operative state shown in FIG. 2, when the recording button (not shown) is depressed, the slide plate 42 is moved along the direction of the arrow A in operative engagement. Thus, the switch S1 is closed, whereby the level of its output changes out of low into high. Because at this time, the loading finish detecting switch S2 is in the opened state and the level of its output is low, the level of the output of the AND circuit AND 1 becomes high so that the level of the output of the OR circuit OR1 changes out of low into high. Thus, the transistor T1 is brought into the closed state and the current runs through the exciting coil of the relay R1. Consequently, the fixed terminal R1a of the relay R1 is connected to the change over terminal R1c, whereby the DC motor is connected to the DC power source. That is, the motor starts to run. The rotation of the motor M is transmitted to the loading ring 22 via the gears 44, 26, 25 and 24 so as to start to rotate the ring 22 along the direction of the arrow C. Along with the rotation of the loading ring 22, the tape 35 is pulled out of the cassette 21 by means of the pull out pins 36 and 37, and brought around the circumference of the guide drum. At the same time, the unloading finish detecting lever 47 is urged out of the concave portion 22b, whereby the switch S3 is opened. Thus, as is shown in FIG. 4, the loading ring 22 rotates by a predetermined angle and the tape 35 is wound over the guide drum about over 180°. When the tape has been loaded, the arm 40b of the loading finish detecting lever 40 is urged into the concave portion 22a formed in the circumference of the ring 22, whereby the detecting lever 40 is rotated around the pin 40a by means of the strength of the spring 45 along the counterclockwise direction.

Along with rotation of the detecting lever 40, the power transmission lever 38 whose rotation is prevented by the engaging pin 41, is rotated along the counterclockwise direction, whereby the change over gear 25 is disengaged from the gear 24 and engaged with worm wheel 27. Accordingly, rotation is not transmitted to the loading ring 22 but to the automatic focusing mechanism driving gears 27 and 28.

Since the loading finish detecting lever 40 is engaged in the concave portion 22a, the loading finish detecting switch S2 is closed and the level of the output of the AND circuit AND 1 becomes low. At this time, the level of the output of the OR circuit OR1 changes out of high into low so as to bring the transistor T1 in the opened state. As a result the fixed terminal R1a of the relay R1 is connected to the change over terminal R1b so as to interrupt the current supply to the motor M, which stops running.

Further, when the arm 40b of the loading finish detecting lever 40 is engaged in the concave portion 22a in the circumference of the loading ring 22, the ring 22 is locked at the loading finish position. When sufficient locking cannot be obtained only from the engagement of the arm 40b in the concave portion 22a, a separate lock means (not shown) is provided so that at the same time with the loading finish, the loading finish ring 22 is locked at the loading finish position. When the tape 35 has been loaded as is shown in FIG. 4, the device is ready for recording. Thereafter, the tape is driven in a conventional way, the recording circuit operates and a recording operation is carried out.

When an automatic focusing lens operation button (not shown) at the side of the camera C is operated, the AF switch S4 in FIG. 3 operates, and because the loading finish detecting switch S2 in FIG. 3 is closed, the AND circuit AND 3 is in an operative state and the focus detecting circuit 12 is brought in the operative state. The circuit 12 detects the focus adjustment state of the automatic focusing lens 3, namely in focus, near focus or far focus and delivers the instruction signal to flip-flops FF1 and FF2 as to whether the rotor is driven forwards or backwards. FF1 is the flip-flop for controlling forward running and its level is high when the lens is near focus. The flip-flop is reset with an in focus signal. FF2 is the flip-flop for controlling backward running and its level is high when the lens is far focus. The flip-flop is reset with the in focus signal.

The above instruction signal is delivered to the OR circuits OR1 and OR2 through the terminal groups t1 and t2 connecting the camera to the VTR, so as to drive the motor M forwards or backwards. Further as is shown in FIG. 4, in this state the mechanical engaging mechanism of the motor M is disengaged from the loading side but engaged with the worm wheel 27 so as to transmit the rotation of the motor to the lens driving mechanism for the automatic focus control at the side of the camera, namely the couplers 14 and 13, and the gears 15, 16 and 17 through the worm gears 27 and 28.

Below, the unloading operation will be explained. In order to start the unloading operation after the recording finish, the recording button is taken out of the depressed state, whereby the slide plate 42 is moved along the direction of the arrow B by means of the strength of the spring 46. As the result, the power transmission change over lever 38 which is engaged with the engaging pin 43 on the slide plate 42, is rotated against the strength of the spring 39 along the clockwise direction in such a manner that the gear 25 is disengaged from the worm wheel 27 and engaged with the gear 24. At the same time, along with the movement of the slide plate 42 along the direction of the arrow B the switch S1 is opened. Namely, the level of the output of the switch S1 becomes low, and because the unloading finish detecting switch S3 is opened and the level of its output is low, the level of the outputs of the AND circuit AND 2 is high. As the result the level of the output of the OR circuit OR2 becomes high and the transistor T2 is brought in the closed state. Consequently, the relay R2 is excited and the motor M starts to rotate. Because in this case the current runs from the terminal Mb through the motor M to the terminal Ma, the motor rotates along the other direction than at the time of the loading. Thus, the rotation of the motor M is transmitted to the loading ring 22 via the gears 44, 26, 25 and 24 so as to rotate the loading ring 22 along the reversed direction of the arrow C, in such a manner that the loading finish detecting lever 40 is taken out of engagement in the concave portion 22a and the switch S2 is opened. When the loading ring 22 resumes the state before the loading in FIG. 2, the unloading finish detecting lever 47 engages the concave portion 22b in the loading ring 22 and the switch S3 is closed. As the result, the level of the output P3 of the switch S3 becomes high, and the level of the output of the AND circuit AND 2 becomes low. Thus, the level of the output of the OR circuit OR2 is low and the transistor T2 is brought in the opened state so that the motor M stops running. Namely, the unloading is finished and the non-operative state in FIG. 2 is again assumed.

As mentioned above, the video system in accordance with the present invention includes the video camera for obtaining the image signal and the video recorder for recording the obtained image signal in such a manner that the driving power of the video recorder is transmitted to the video camera so as to drive movable parts of the video camera. Consequently, it is not necessary to provide the video camera the compact video camera can easily be realized. Especially in the case of a video recorder in which the image signal is recorded on a tape shaped recording medium, the driving power not needed for loading the tape during recording is transmitted from the loading motor to the camera, so that one motor can be used in common. Even when an automatic focusing adjusting mechanism is arranged on the video camera, the driving power is obtained from the side of the VTR so that there is no danger that the system becomes too large, and a video system which is quite handy and easy to carry then can be offered to potential users.

The present invention is not limited to the present embodiment but can be varied in many ways within the scope of the claims.

What is claimed is:

1. A video system comprising:
   (A) a video camera including:
   image pickup means for transducing a photo-image to an electrical signal;
   a lens system for projecting an image of an object to be photographed onto an image receiving surface of said image pickup means; and
   a lens moving mechanism for moving said lens system;
   (B) a video signal recording apparatus including:
   recording means for recording video signals corresponding to the electrical signal on a recording medium;
   a medium moving mechanism for moving said recording medium; and
   an electric motor for generating driving torque to move said moving mechanism;
   (C) connecting means for mechanically connecting said video camera and said recording apparatus directly with each other; and
   (D) transmission mechanism forming means for mechanically transmitting the driving torque to said lens moving means when said connecting means connects said video camera to said recording apparatus.

2. A video system according to claim 1, wherein said lens moving mechanism is arranged for adjusting the focusing position.

3. A video system according to claim 1, wherein said recording medium is a tape-shaped medium.

4. A video system according to claim 3, wherein said video signal recording apparatus has as a drum for guiding said tape-shaped medium and wherein said medium moving means includes loading means for loading said tape-shaped medium and placing said medium in contact with said drum at a predetermined angle.

5. A video system according to claim 4, wherein said recording apparatus further includes loading completion detecting means for detecting when loading of said loading means has been completed, and changeover means responsive to detection of said detecting means for making said transmission mechanism forming means ready to operate.

6. A video system according to claim 4, wherein said video medium moving means in said signal recording apparatus has unloading means for unloading said tape-shaped medium and taking said tape-shaped medium out of contact with said guide drum.

7. A video system according to claim 6, further including prohibiting means for prohibiting the driving torque from being transmitted to said lens moving mechanism when said unloading means is operating.

8. A video system according to claim 1, further including control means for prohibiting the driving torque from being transmitted to said lens moving means when said medium moving mechanism is operating.

9. A video system according to claim 1, further including transmitting means for transmitting said electrical signal to said recording means when said connecting means are connected.

* * * * *